(12) United States Patent
Biguenet

(10) Patent No.: US 10,183,890 B2
(45) Date of Patent: Jan. 22, 2019

(54) METHOD OF CURING A GYPSUM CALCINATION PRODUCT

(71) Applicant: Saint-Gobain Placo SAS, Suresnes (FR)

(72) Inventor: Cedric Biguenet, Couzeix (FR)

(73) Assignee: Saint-Gobain Placo SAS (FR)

( * ) Notice: Subject to any disclaimer, the term of this patent is extended or adjusted under 35 U.S.C. 154(b) by 145 days.

(21) Appl. No.: 15/110,420

(22) PCT Filed: Jan. 8, 2015

(86) PCT No.: PCT/EP2015/050267
§ 371 (c)(1),
(2) Date: Jul. 8, 2016

(87) PCT Pub. No.: WO2015/104340
PCT Pub. Date: Jul. 16, 2015

(65) Prior Publication Data
US 2016/0340244 A1    Nov. 24, 2016

(30) Foreign Application Priority Data

Jan. 10, 2014 (EP) ..................................... 14368008

(51) Int. Cl.
*C04B 11/00* (2006.01)
*C04B 11/06* (2006.01)

(52) U.S. Cl.
CPC .......... *C04B 11/002* (2013.01); *C04B 11/007* (2013.01); *C04B 11/06* (2013.01)

(58) Field of Classification Search
CPC ....... C04B 11/00; C04B 11/06; C04B 11/002; C04B 11/007
See application file for complete search history.

(56) References Cited

U.S. PATENT DOCUMENTS

| 5,169,617 A | 12/1992 | Clemens et al. |
| 6,054,101 A | 4/2000 | Langfeldt et al. |

FOREIGN PATENT DOCUMENTS

| CN | 101563303 B | 5/2013 |
| EP | 1547984 A1 | 6/2005 |
| GB | 1400830 A | 7/1975 |
| WO | 2008074137 A1 | 6/2008 |

OTHER PUBLICATIONS

Hilgraf, Quality Improvement of Beta-Plasters, 2011, pp. 38-50, vol. 64, ZKG International, Gütersloh, Germany.

*Primary Examiner* — Anthony J Green
(74) *Attorney, Agent, or Firm* — GrayRobinson, P.A.; Michael J. Colitz, III

(57) ABSTRACT

A method of conditioning stucco comprises the steps of supplying a quantity of stucco particles to a reaction vessel, the stucco particles comprising calcium sulphate hemihydrate and/or calcium sulphate anhydrite, as well as calcium sulphate dihydrate; and conditioning the stucco particles at a temperature of at least 100° C. and a humidity of at least 70%. During the step of conditioning the stucco particles, the bulk density of the stucco particles within the reaction vessel is at least 1 g/cm$^3$.

15 Claims, No Drawings

METHOD OF CURING A GYPSUM CALCINATION PRODUCT

CLAIM OF PRIORITY

This application is a continuation of and claims priority under 35 U.S.C. § 371 to International Application No. PCT/EP2015/050267 filed on Jan. 8, 2015, which in turn claims priority to EP App. No. 14368008.5 filed on Jan. 10, 2014, the contents of which are incorporated herein by reference for all purposes.

The present invention relates to a method of conditioning a gypsum calcination product, and particularly to a method for increasing the hemihydrate content of the calcination product.

Gypsum (calcium sulphate dihydrate) is available as a naturally-occurring raw material or as a synthetic by-product of flue gas desulphurisation. The manufacture of gypsum-containing products, such as plasterboard, typically comprises the following steps:

- subjecting calcium sulphate dihydrate ($CaSO_4 \cdot 2H_2O$) to a calcination process at temperatures greater than about 150° C. in order to drive off the chemically bound water of crystallisation, and provide a calcination product (also known as stucco) comprising mainly calcium sulphate hemihydrate ($CaSO_4 \cdot \frac{1}{2}H_2O$);
- mixing the stucco with water to provide a slurry and casting the slurry into a pre-determined shape;
- allowing the stucco to set to provide a solid product. During this stage, the calcium sulphate hemihydrate becomes re-hydrated to provide dihydrate crystals.

In general, the stucco formed through calcination comprises other phases in addition to calcium sulphate hemihydrate. In particular, the stucco may contain calcium sulphate anhydrite ($CaSO_4$). This form of calcium sulphate has no chemically bound water molecules, and is undesirable because of its adverse effect on the setting time and/or water demand of the stucco slurry.

Therefore, it is desirable to reduce the level of calcium sulphate anhydrite in stucco.

Therefore, at its most general, the present invention may provide a conditioning treatment to increase the proportion of hemihydrate phase within a calcined stucco product. More particularly, the conditioning treatment comprises heat-treating a calcined product in a humid environment at a temperature below the calcination temperature.

It has been found that such a conditioning treatment may help to decrease the water demand of the stucco. Additionally, it has been found that the treatment may result in a reduced specific surface area of the stucco, which may help to decrease the overall setting time of the stucco slurry, while retaining the fluidity of the slurry in the early stages of the hydration process.

It has further been found that the presence of dihydrate particles within the stucco during the conditioning treatment may assist in reducing the levels of anhydrite particles. This is considered to be due to the release of chemically-bound water molecules from the dihydrate particles, these water molecules then being available to promote the transformation of anhydrite particles to hemihydrate particles. The presence of dihydrate particles within the stucco during the conditioning process is considered to promote a better distribution of humidity than other methods such as the introduction of steam into the stucco.

In particular, it has been found that the conversion of the anhydrite phase to hemihydrate may be promoted by maintaining a high bulk density of stucco particles during the conditioning treatment. This high degree of compaction is considered to help to promote the exchange of water molecules between particles.

Therefore, in a first aspect, the present invention may provide a method of conditioning stucco comprising the steps of:

- supplying a quantity of stucco particles to a reaction vessel, the stucco particles comprising calcium sulphate dihydrate and at least one of calcium sulphate hemihydrate and calcium sulphate anhydrite; and
- conditioning the stucco particles at a temperature of at least 100° C., and a humidity of at least 70%,
  wherein during the step of conditioning the stucco particles, the bulk density of the stucco particles within the reaction vessel is at least 1 $g/cm^3$.

Preferably, the bulk density of the stucco particles within the reaction vessel is at least 1.5 $g/cm^3$, more preferably at least 2 $g/cm^3$.

The high bulk density of the stucco particles is achieved by holding the particles statically within the reaction vessel. Previous methods of conditioning stucco (such as described in e.g. US2012/0060723 and US2011/0150750) required the stucco to be entrained in process gas, e.g. fluidised. Thus, the bulk density of the stucco was much lower than for the present invention e.g. around 0.7-0.9 $g/cm^3$.

Typically, the conditioning time is at least 30 minutes, preferably at least one hour.

Typically, the treatment temperature is at least 130° C. In general, the pressure within the reaction vessel during the step of treating the stucco particles is less than 2 bar.

In general, the stucco particles supplied to the reaction vessel comprise calcium sulphate anhydrite. Typically, this is in the form of calcium sulphate anhydrite III, which is a soluble form of calcium sulphate anhydrite. Calcium sulphate anhydrite III may be present in an amount of up to 70 wt %. However, the calcium sulphate anhydrite III amount is preferably lower than 15 wt %. Typically, the calcium sulphate anhydrite amount is greater than 10 wt %.

Typically, the stucco particles supplied to the reaction vessel comprise calcium sulphate dihydrate in an amount greater than 3 wt %, preferably greater than 5 wt %. Typically, the amount of calcium sulphate dihydrate is less than 20 wt %, preferably less than 10 wt %.

The calcium sulphate dihydrate particles present in the stucco may result from incomplete calcination of the gypsum material (for example, through lower calcination times or temperatures). In an alternative example of the method of the invention, calcium sulphate dihydrate may be added separately to the calcined stucco.

Typically, the stucco is supplied to the reaction vessel in an amount to fill at least 80%, preferably 85% of the internal volume of the vessel. That is, the bulk volume of the stucco within the reaction vessel (including gaps between adjacent stucco particles) is at least 80% and preferably at least 85% of the internal volume of the vessel.

The invention will now be described by way of example only.

EXAMPLES 1-5

Gypsum (calcium sulphate dihydrate) was calcined in a calcination kettle at a temperature of 190° C. for about 1 hour. After calcining, further gypsum (calcium sulphate dihydrate) was added to the calcination product to provide a gypsum-enriched calcination product. This mixture was then transferred to a steam pressure vessel. The steam pressure vessel was sealed and placed in an oven at 130° C. for 4 hours to condition the stucco. After this treatment, the conditioned stucco was immediately placed into a metallic bucket and allowed to cool.

Table 1 shows the anhydrite and dihydrate contents, water demand and specific surface area of the gypsum-enriched calcination product before and after conditioning in the steam pressure vessel. Each example was prepared from a different grade of gypsum, the d50 value of each gypsum grade being indicated in the Table.

The specific surface area was measured through BET.

TABLE 1

| Example | D50 | | AIII (%) | Residual gypsum (%) | Water demand | BET (m²/g) |
|---|---|---|---|---|---|---|
| 1 | 50 μm | Before | 30 | 15.4 | 85 | 10.4 |
|   |   | After | 2.4 | 4.3 | 65 | 7.9 |
| 2 | 25 μm | Before | 20 | 14.5 | 90 | 11.4 |
|   |   | After | 4.4 | 4.6 | 80 | 10.9 |
| 3 | 61 μm | Before | 10.1 | 8.6 | 87 | 10.9 |
|   |   | After | 0 | 3.8 | 68 | 8.2 |
| 4 | 8 μm | Before | 22 | 10.4 | 92 | 12.9 |
|   |   | After | 2.3 | 3.9 | 80 | 9.5 |
| 5 | 13 μm | Before | 21.7 | 11.8 | 91 | 10.1 |
|   |   | After | 0.3 | 4.1 | 73 | 8.0 |

As shown by Table 1, the conditioning treatment decreases the levels of anhydrite and dihydrate in the stucco, and additionally decreases the water demand and the specific surface area.

Examples 6 and 7, and Comparative Example 1

Gypsum (calcium sulphate dihydrate) was calcined in a calcination kettle at a temperature of 190° C. for about 1 hour, to provide a calcination product. After calcining, further gypsum (calcium sulphate dihydrate) was added to the calcination product in an amount corresponding to 5 wt % of the calcination product, to provide a gypsum-enriched calcination product. This mixture was then transferred to a steam pressure vessel. The steam pressure vessel was sealed and placed in an oven for 2 hours to condition the stucco. After this treatment, the conditioned stucco was immediately placed into a metallic bucket and allowed to cool.

Table 2 shows the anhydrite and dihydrate contents, water demand and specific surface area of the conditioned stucco as a function of oven temperature. Corresponding parameters for the direct calcination product (that is, without gypsum enrichment) are also given, for reference.

The specific surface area was measured through BET.

TABLE 2

| Example | Conditioning temperature | AIII (%) | Gypsum (%) | Water demand (%) | BET (m²/g) |
|---|---|---|---|---|---|
| Comparative example 1 | Not applicable | 8.3 | 4.4 | 80 | 12.1 |
| Example 6 | 120° C. | 2.2 | 4.4 | 72 | 10.1 |
| Example 7 | 130° C. | 0.8 | 4 | 65 | 9.6 |

Examples 8-10 and Comparative Example 1

Gypsum (calcium sulphate dihydrate) was calcined in a calcination kettle at a temperature of 190° C. for about 1 hour, to provide a calcination product. After calcining, further gypsum (calcium sulphate dihydrate) was added to the calcination product in an amount corresponding to 8 wt % of the direct calcination product, to provide a gypsum-enriched calcination product. This mixture was then transferred to a steam pressure vessel. The steam pressure vessel was sealed and placed in an oven at 130° C. to condition the stucco.

After this treatment, the conditioned stucco was immediately placed into a metallic bucket and allowed to cool.

Table 3 shows the anhydrite and dihydrate contents, water demand and specific surface area of the conditioned stucco as a function of conditioning time. Corresponding parameters for the direct calcination product (that is, without gypsum enrichment) are also given, for reference.

TABLE 3

| Example | Conditioning time | AIII (%) | Gypsum (%) | Water demand (%) | BET (m²/g) |
|---|---|---|---|---|---|
| Comparative example 1 | Not applicable | 8.3 | 4.4 | 80 | 12.1 |
| Example 8 | 1 h | 0 | 3.9 | 65 | 7.4 |
| Example 9 | 2 h | 0 | 3.5 | 62 | 6.4 |
| Example 10 | 4 h | 0 | 3.2 | 63 | 6.5 |

Examples 11-13 and Comparative Example 1

Gypsum (calcium sulphate dihydrate) was calcined in a calcination kettle at a temperature of 190° C. for about 1 hour, to provide a calcination product. After calcining, further gypsum (calcium sulphate dihydrate) was added to the calcination product to provide a gypsum-enriched calcination product. This mixture was then transferred to a steam pressure vessel. The steam pressure vessel was sealed and placed in an oven at 130° C. for 2 hours to condition the stucco. After this treatment, the conditioned stucco was immediately placed into a metallic bucket and allowed to cool.

Table 4 shows the anhydrite and dihydrate contents, water demand and specific surface area of the conditioned stucco as a function of the level of gypsum enrichment. Corresponding parameters for the direct calcination product (that is, without gypsum enrichment) are also given, for reference.

TABLE 4

| Example | Gypsum addition (relative to the direct calcination product) | AIII (%) | Gypsum (%) | Water demand (%) | BET (m²/g) |
|---|---|---|---|---|---|
| Comparative Example 1 | Not applicable | 8.3 | 4.4 | 80 | 12.1 |
| Example 11 | 15 wt % | 1.8 | 5.9 | 74 | 7.6 |
| Example 12 | 8 wt % | 0 | 3.5 | 62 | 6.4 |
| Example 13 | 5 wt % | 0.8 | 4 | 65 | 9.6 |

Examples 14-16 and Comparative Example 1

Gypsum (calcium sulphate dihydrate) was calcined in a calcination kettle at a temperature of 190° C. for about 1 hour, to provide a calcination product. After calcining, further gypsum (calcium sulphate dihydrate) was added to the calcination product to provide a gypsum-enriched calcination product. This mixture was then transferred to a steam pressure vessel. The steam pressure vessel was sealed and placed in an oven at 130° C. for 4 hours to condition the stucco. After this treatment, the conditioned stucco was immediately placed into a metallic bucket and allowed to cool.

Table 5 shows the anhydrite and dihydrite contents, water demand and specific surface area of the conditioned stucco as a function of extent to which the stream pressure vessel was filled with the gypsum-enriched calcination product. Corresponding parameters for the direct calcination product (that is, without gypsum enrichment) are also given, for reference.

TABLE 5

| Example | Extent of filling | AIII (%) | Gypsum (%) | Water demand (%) | BET ($m^2/g$) |
|---|---|---|---|---|---|
| Comparative Example 1 | Not applicable | 8.3 | 4.4 | 80 | 12.1 |
| Example 14 | 70% | 1.8 | 4.4 | 75 | 8.7 |
| Example 15 | 77% | 0.6 | 3.5 | 76 | 8.8 |
| Example 16 | 90% | 0 | 3.2 | 63 | 6.5 |

Examples 17 and 18, and Comparative Example 1

Gypsum (calcium sulphate dihydrate) was calcined in a calcination kettle at a temperature of 190° C. for about 1 hour, to provide a calcination product. After calcining, further gypsum (calcium sulphate dihydrate) was added to the calcination product to provide a gypsum-enriched calcination product. This mixture was then transferred to a steam pressure vessel. The steam pressure vessel was sealed and placed in an oven at 130° C. for 1 hour to condition the stucco. After this treatment, the conditioned stucco was immediately placed into a metallic bucket and allowed to cool.

Table 6 shows the anhydrite and dihydrite contents, water demand and specific surface area of the conditioned stucco as a function of the pressure within the steam vessel. Corresponding parameters for the direct calcination product (that is, without gypsum enrichment) are also given, for reference.

TABLE 6

| Example | Pressure within steam vessel | AIII (%) | Gypsum (%) | Water demand (%) | BET ($m^2/g$) |
|---|---|---|---|---|---|
| Comparative example 1 | Not applicable | 8.3 | 4.4 | 80 | 12.1 |
| Example 17 | 1.5 bars | 0 | 3.9 | 65 | 7.4 |
| Example 18 | Atmospheric pressure | 1.1 | 4.3 | 63 | 10.6 |

The invention claimed is:

1. A method of conditioning stucco comprising the steps of:
   supplying a quantity of stucco particles to a reaction vessel, the stucco particles comprising calcium sulphate dihydrate and at least one of calcium sulphate hemihydrate and calcium sulphate anhydrite; and
   conditioning the stucco particles at a temperature of at least 100° C. and a humidity of at least 70%,
   wherein during the step of conditioning the stucco particles, the stucco particles are held statically within the reaction vessel, such that the bulk density of the stucco particles within the reaction vessel is at least 1 g/cm$^3$;
   and further wherein the humidity of at least 70% is provided by the release of chemically-bound water molecules from the dihydrate particles.

2. A method according to claim 1, wherein the bulk density of the stucco particles within the reaction vessel is at least 1.5 g/cm$^3$.

3. A method according to claim 1, wherein the conditioning time of the stucco particles is at least 30 minutes.

4. A method according to claim 1, wherein the conditioning temperature is at least 130° C.

5. A method according to claim 1, wherein the pressure inside the reaction vessel during the step of conditioning the stucco particles is less than 2 bar.

6. A method according to claim 1, wherein the stucco particles supplied to the reaction vessel comprise calcium sulphate anhydrite.

7. A method according to claim 6, wherein the stucco particles supplied to the reaction vessel comprise calcium sulphate anhydrite III.

8. A method according to claim 7, wherein the stucco particles supplied to the reaction vessel comprise calcium sulphate anhydrite III in an amount of up to 70 wt %.

9. A method according to claim 8, wherein the stucco particles supplied to the reaction vessel comprise calcium sulphate anhydrite III in an amount of between 10-15 wt %.

10. A method according to claim 1, wherein the stucco particles supplied to the reaction vessel comprise calcium sulphate dihydrate in an amount of 3-20 wt %.

11. A method according to claim 10, wherein the stucco particles supplied to the reaction vessel comprise calcium sulphate dihydrate in an amount of 5-10 wt %.

12. A method according to claim 1, further comprising the step of calcining gypsum material in a calcination vessel to provide the stucco particles for supplying to the reaction vessel.

13. A method according to claim 12, wherein the calcium sulphate dihydrate present in the stucco particles comprises residual calcium sulphate dihydrate resulting from incomplete calcination of the gypsum material.

14. A method according to claim 1, wherein the calcium sulphate dihydrate and the calcium sulphate hemihydrate are provided from separate sources.

15. A method according to claim 1, wherein the stucco particles are supplied to the reaction vessel in an amount such that a bulk volume of the stucco particles occupies at least 80% of an internal volume of the reaction vessel.

* * * * *